United States Patent
Kou et al.

(10) Patent No.: US 11,688,057 B2
(45) Date of Patent: Jun. 27, 2023

(54) METHOD AND SYSTEM FOR QUICKLY MATCHING IMAGE FEATURES APPLIED TO MINE MACHINE VISION

(71) Applicant: China University of Mining and Technology, Xuzhou (CN)

(72) Inventors: Qiqi Kou, Xuzhou (CN); Deqiang Cheng, Xuzhou (CN); Yuchen Wang, Xuzhou (CN); Haixiang Li, Xuzhou (CN); Liangliang Chen, Xuzhou (CN); Kai Zhao, Xuzhou (CN); Rui Gao, Xuzhou (CN); Xinzhu Fu, Xuzhou (CN)

(73) Assignee: CHINA UNIVERSITY OF MINING AND TECHNOLOGY, Xuzhou (CN)

(*) Notice: Subject to any disclaimer, the term of this patent is extended or adjusted under 35 U.S.C. 154(b) by 154 days.

(21) Appl. No.: 17/228,979

(22) Filed: Apr. 13, 2021

(65) Prior Publication Data

US 2022/0020134 A1 Jan. 20, 2022

(30) Foreign Application Priority Data

Jul. 15, 2020 (CN) .......................... 202010681652.1

(51) Int. Cl.
*G06V 10/75* (2022.01)
*G06T 7/00* (2017.01)
(Continued)

(52) U.S. Cl.
CPC .............. *G06T 7/001* (2013.01); *G06F 18/22* (2023.01); *G06V 10/30* (2022.01); *G06V 10/751* (2022.01); *G06V 10/761* (2022.01); *G06T 2207/10016* (2013.01); *G06T 2207/20076* (2013.01); *G06T 2207/30108* (2013.01); *G06T 2207/30181* (2013.01)

(58) Field of Classification Search
CPC ........... G06T 7/001; G06T 2207/10016; G06T 2207/20076; G06T 2207/30108; G06T 2207/30181; G06V 10/761; G06V 10/751; G06V 10/30; G06K 9/6215
See application file for complete search history.

(56) References Cited

U.S. PATENT DOCUMENTS 10,935,318 B2 * 3/2021 Baumert .................... F27B 3/18
11,243,327 B2 * 2/2022 Scoullar ................. G01N 23/10
(Continued)

OTHER PUBLICATIONS

Guo, Shi & Yan, Zifei & Zhang, Kai & Zuo, Wangmeng & Zhang, Lei. (2019). Toward Convolutional Blind Denoising of Real Photographs. 1712-1722. 10.1109/CVPR.2019.00181. (Year: 2019).*

*Primary Examiner* — Ian L Lemieux
(74) *Attorney, Agent, or Firm* — Onello & Mello, LLP

(57) ABSTRACT

A method and system for matching image features is applied to mine machine vision. The method includes de-noising an image, performing super-pixel segmentation to obtain a plurality of image blocks, calculating the information entropy of each image block to obtain an image block with information entropy greater than a first preset threshold, extracting feature points of the image block, to obtain the feature point set of the image, using a wavelet method to describe the feature points in the feature point set to obtain a feature point descriptor set, and matching feature points in the feature point set with the feature points of a target image.

10 Claims, 2 Drawing Sheets

(51) Int. Cl.
    *G06V 10/30*    (2022.01)
    *G06V 10/74*    (2022.01)
    *G06F 18/22*    (2023.01)

(56) References Cited

U.S. PATENT DOCUMENTS

| | | | |
|---|---|---|---|
| 11,351,576 B2* | 6/2022 | Hunt | B07C 5/344 |
| 2008/0192987 A1* | 8/2008 | Helgason | G01N 33/24 |
| | | | 382/109 |
| 2009/0245588 A1* | 10/2009 | Vince | G01N 15/1475 |
| | | | 382/109 |
| 2010/0284609 A1* | 11/2010 | Ding | G01B 11/2522 |
| | | | 382/154 |
| 2019/0299255 A1* | 10/2019 | Chaganti | G06V 10/141 |

* cited by examiner

METHOD AND SYSTEM FOR QUICKLY MATCHING IMAGE FEATURES APPLIED TO MINE MACHINE VISION

CROSS REFERENCE TO RELATED APPLICATION

This application claims the priority of Chinese Patent Application No. 202010681652.1, filed on Jul. 15, 2020, entitled "Method And System For Quickly Matching Image Features Applied To Mine Machine Vision," which is incorporated herein by reference in its entirety.

TECHNICAL FIELD

The present disclosure relates to the technical field of mine safety, in particular to a method and a system for quickly matching image features applied to mine machine vision.

BACKGROUND

In recent years, with the rapid development of science and technology and the improvement of the coal industry system, coal mining has gradually developed towards safety, high efficiency and automation. A main form of coal mines is underground mines, and coal transportation in underground mines tends to be high-speed and belt-driven. A belt conveyor has become the main tool for coal transportation in various coal mines. In the process of coal transportation, some abnormal situations may occur, such as large coal piles, anchor bolts being inserted into and tearing belts, causing damage to equipment and laying hidden dangers for underground safety. A camera may be installed above a coal conveyor. Through video images captured by the camera, a video processing method may be used to analyze the picture of each frame. By estimating the belt coal flow, the belt speed may be controlled, and possible abnormal situations such as large coal (rock) blocks, coal piles and anchor rods at the coal drop port may be intelligently detected.

Under the special industrial and mining environment, the video images collected in coal mines have low illumination, great changes, large background noise and uneven noise distribution. The all-weather artificial lighting environment in coal mines, dust and humidity, and other factors, results in poor image collection quality, which greatly affects the presentation quality of the scene and the linkage effect of remote active early warning, and limits the high-quality collection of mine videos and effectively prevents the occurrence of abnormal situations. The traditional coal mine video monitoring system can only record the monitoring scene, which requires the staff to observe carefully and continuously. It not only requires a high degree of attention, but also cannot quickly deal with accidents when abnormal situations such as coal piling occur. In the detection and identification of large coal (rock) blocks and anchor rods, the colors of large coal (rock) blocks, anchor rods and coal are gray, and the possibility of contamination with coal ash, which is very close to the color of coal under low illumination, is very high. This particularity brings great difficulties to manual quick resolution, and also limits the application of current methods in underground abnormal situation detection.

The prior art has at least the following defects: first, mine abnormalities are monitored manually through a mine monitoring system and, although abnormal conditions such as large coal (rock) blocks, coal piles, anchor rods and the like can be detected, the underground lighting equipment is different from natural light: the illumination distribution is uneven, the outline of an object is only faintly visible, and objects cannot be completely distinguished clearly manually. As a result, the efficiency and accuracy are low; and second, under the restriction of underground working environment, the color of large coal (rock) blocks and anchor bolts is very close to that of coal under low illumination. Proper detection therefore requires careful observation and a period of reaction time to make judgments manually. The result is poor real-time performance and that is not conducive to finding mine anomalies in time and dealing with them.

SUMMARY

In example embodiments a method and a system for quickly matching image features may be applied to a mine machine vision system, to solve the problems of low efficiency, poor real-time performance and low accuracy of the existing manual monitoring method.

In example embodiments a method for quickly matching image features applied to mine machine vision, includes de-noising an image to be analyzed using CBDNet network, wherein the image to be analyzed is captured mine video frame image also referred to herein as a screen-grab to produce a de-noised image;

performing super-pixel segmentation on the de-noised image to obtain a plurality of image blocks;

calculating the information entropy of each image block to produce an image block with information entropy greater than a first preset threshold;

using a SURF process to extract feature points of the image block with information entropy greater than a first preset threshold, to obtain a feature point set of the image to be analyzed;

using the Harr wavelet method to describe each feature point in the feature point set, so as to obtain the feature point descriptor set of the image to be analyzed;

matching the feature points in the feature point set of the image to be analyzed with the feature points of a target image based on the feature point descriptor set of the image to be analyzed to determine whether the an aspect of the mine is abnormal, wherein the target image is an image containing information related to potential abnormalities of the mine.

In example embodiments, the information entropy of each image block may be given by:

calculating the probability that all pixels in the image block are in the gray intensity level i:

$$p_i = \frac{h_i}{\sum_{i=1}^{L} h_i}$$

where i denotes the gray intensity level of pixels, $i \in [1,L]$, L denotes the number of gray intensity levels, and $h_i$ denotes the number of pixels in the gray intensity level i in the image block;

calculating and obtaining the information entropy of each image block:

$$H(A) = \Sigma_{i=1}^{L} p_i \log p_i, \ i \in [1,L].$$

The number of pixels in the gray intensity level i in each image block is obtained according to the gray histogram of each image block.

In example embodiments, extracting feature points of an image block includes:

sequentially processing an image block by a plurality of filters with different sizes to obtain a plurality of image layers with the same image size and different scales in discrete space and the filter response value of each pixel point of the image in each image layer;

evenly dividing multiple image layers into a plurality of groups of image stacks according to the scale, wherein the image scales from the first image layer in the first group of image stacks to the last image layer in the last group of image stacks increase in sequence, and adjacent two groups of image stacks contain image layers with images of the same scale;

removing pixels with filter response values less than a second preset threshold value in each image layer to obtain a preliminary feature point set;

taking any preliminary feature point as the feature point to be operated, adaptively selecting a corresponding suppression radius, performing non-maximum suppression in the image layer where the point to be operated is located and in its adjacent image layer, removing pixels whose filter response value is less than that of the feature point to be operated, and traversing each preliminary feature point to obtain the feature point of the image block.

In example embodiments, the filter size for obtaining the image of the $l_{th}$ image layer in the $o_{th}$ group of image stacks is:

$$L=3\times[2^{o+1}\times(l+1)+1]$$

Where o=1, 2, 3 . . . m, and l=1, 2, 3 . . . t the obtained image scale of the $l_{th}$ image layer in the $o_{th}$ group of image stacks is:

$$s_{appox} = L \times \frac{s_0}{L_0}$$

where $L_0$ is the filter size for obtaining the image of the first image layer in the first group of image stacks, and $S_0$ is the scale of the image of the first image layer in the first group of image stacks.

In example embodiments, prior to describing the feature points, the method further includes:

obtaining the offset of coordinates of each feature point in the feature point set of the image to be analyzed using a Taylor series interpolation method;

correcting the coordinates of the corresponding feature points in the discrete space by using the coordinate offset to obtain the coordinates of all the feature points of the image to be analyzed in the continuous space, and determining the positions of the corresponding feature points based on the coordinates.

In example embodiments, using the Harr wavelet method to describe each feature point in the feature point set, so as to obtain the feature point descriptor set of the image to be analyzed, includes:

obtaining the main direction of each feature point in the feature point set;

constructing a rectangular neighborhood with a preset side length by taking any feature point as a center, taking the main direction of the feature point as the main direction of the rectangular neighborhood, and dividing the rectangular neighborhood into a plurality of sub-regions with preset sizes;

calculating horizontal Haar wavelet response and vertical Haar wavelet response of each pixel point in each sub-region and summing them, respectively, to obtain the sum $\Sigma d_x$ of horizontal Haar wavelet response and the sum $\Sigma d_y$ of vertical Haar wavelet response in the sub-region, the sum $\Sigma|d_x|$ of horizontal Haar wavelet response absolute value and the sum $\Sigma|d_y|$ of vertical Haar wavelet response absolute value in the sub-region, wherein the descriptor of the sub-region is $V_j[\Sigma d_x, \Sigma d_y, \Sigma|d_x|, \Sigma|d_y|]$, so as to obtain the descriptor $V=[V_1, V_2, V_3 \ldots V_s]$ of the feature point, $j \in [1,S]$, and S is the number of sub-regions in the rectangular region;

traversing each feature point to obtain a descriptor of each feature point.

In example embodiments, the main direction of each feature point in the feature point set is obtained by:

constructing a circular neighborhood with a preset radius size by taking any feature point in the feature point set as a center, and determining pixels included in the circular neighborhood according to the position coordinates of any feature point;

calculating the horizontal Haar wavelet response and the vertical Haar wavelet response of each pixel point in the circular neighborhood, and giving Gaussian weight coefficients to the horizontal Haar wavelet response and the vertical Haar wavelet response of the pixel point according to the distance between the pixel point and the feature point;

counting the sum of the horizontal Haar wavelet response and the vertical Haar wavelet response after giving Gaussian weight coefficient to all other feature points in a 60° sector area with the feature point as the center to obtain a corresponding direction vector;

rotating the 60° sector area in a preset angle unit, traversing the circular neighborhood of the feature points to obtain corresponding direction vectors, comparing all the direction vectors, and taking the direction corresponding to the longest direction vector as the main direction of the feature points;

traversing each feature point to obtain the main directions of all feature points.

In example embodiments, matching the feature points in the feature point set of the image to be analyzed with the feature points of the target image based on the feature point descriptor set of the image to be analyzed to confirm whether an aspect of the mine is abnormal comprises:

obtaining Euclidean distance between any feature point in the feature point set of the image to be analyzed and each feature point in the feature point set of the target image based on descriptors of any feature point in the feature point set of the image to be analyzed, and determining Euclidean distance between the nearest feature point and the next nearest feature point and any feature point in the feature point set of the image to be analyzed;

if the ratio of Euclidean distances between the nearest feature point and the next nearest feature point is less than a preset value, judging that any feature point in the image to be analyzed matches the nearest feature point of the target image as a feature point pair;

traversing all feature points in the feature point set of the image to be analyzed for matching;

if the matching rate between the feature points in the feature point set of the image to be analyzed and the feature points in the feature point set of the target image reaches a third preset threshold, judging that the mine is abnormal.

In example embodiments, a system for quickly matching image features applied to mine machine vision, includes:

a de-noising module, which is configured to de-noise an image to be analyzed using CBDNet network, wherein the image to be analyzed is an captured mine video frame image;

an image segmenting module, which is configured to perform super-pixel segmentation on the image to be analyzed obtained by de-noising to obtain a plurality of image blocks;

an image block screening module, which is configured to calculate the information entropy of each image block to obtain an image block with information entropy greater than a first preset threshold;

a feature point set acquiring module, which is configured to use SURF algorithm to extract feature points of the image block with information entropy greater than a first preset threshold, to obtain the feature point set of the image to be analyzed;

a feature point describing module, which is configured to use the Harr wavelet method to describe each feature point in the feature point set, to obtain the feature point descriptor set of the image to be analyzed; and a determining module, which is configured to match the feature points in the feature point set of the image to be analyzed with the feature points of the target image based on the feature point descriptor set of the image to be analyzed to determine whether an aspect of the mine is abnormal, wherein the target image is an image containing information related to potential abnormalities of the mine.

Compared with the prior art, the inventive concepts may achieve at least one of the following beneficial effects:

1. The method and the system for quickly matching image features applied to mine machine vision provided by the present disclosure matches each frame of images in mine monitoring video with images containing potential mine abnormalities to automatically determine whether an aspect of the mine is abnormal, avoid the problems of low efficiency, poor real-time performance and low accuracy of manual judgment, and save labor cost to a certain extent.

2. According inventive concepts, image blocks may be obtained by super-pixel segmentation and information entropy calculation of video frame images, and a system in accordance with principles of inventive concepts may judge whether the mine is abnormal based on the image blocks. Through super-pixel segmentation, the definition of the underground object outline and the perception of object color information can be improved, the accuracy of identifying mine anomalies is improved, and the defects are avoided that the underground environment illumination distribution is uneven, it is difficult to distinguish the object outline, and the mine dust and low illumination make the object color close to the surrounding environment color so that it is difficult for people to judge the mine abnormal situation; in addition, a system in accordance with principles of inventive concepts may make determinations based on a part of image blocks of the video frame image, thus avoiding calculation based on all pixels of the whole video frame image, which greatly reduces the calculation amount, improves the efficiency and real-time performance of identifying mine anomalies, and is beneficial to processing mine anomalies in time.

In example embodiments, the above methods may be combined with each other to realize additional combination schemes. Other features and advantages of the present disclosure will be set forth in the following description, and some advantages will be obvious from the description, or may be learned by practicing the present disclosure. The objects and other advantages of the present disclosure can be realized and obtained from what is particularly pointed out in the specification and the accompanying drawings.

BRIEF DESCRIPTION OF THE DRAWINGS

The drawings are for the purpose of illustrating specific embodiments only, and are not to be considered as limiting the present disclosure, and like reference numerals refer to like parts throughout the drawings.

DETAILED DESCRIPTION

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Figure 1:
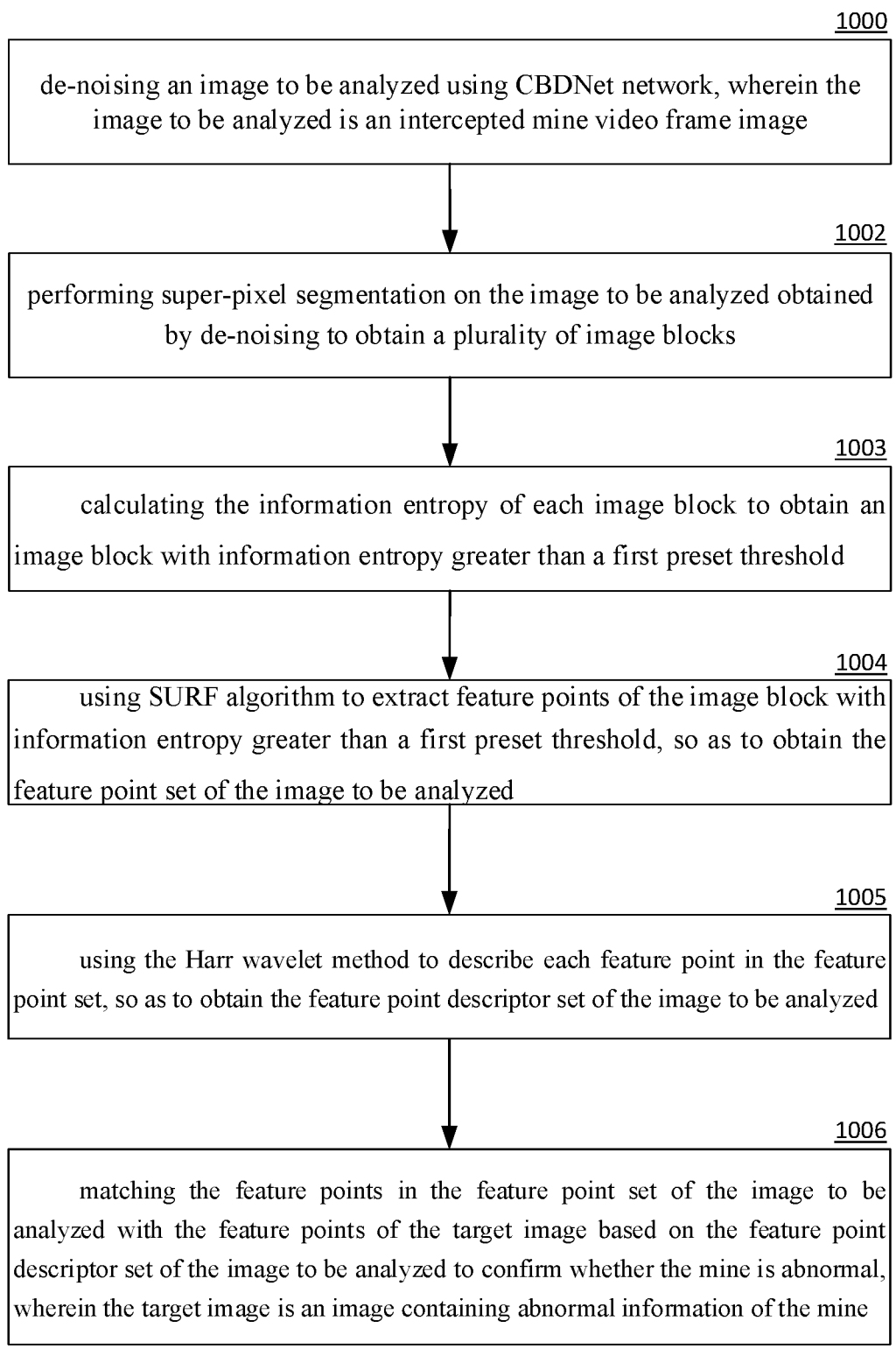
FIG. 1 is a flowchart of a method for quickly matching image features applied to mine machine vision according to an embodiment of the present disclosure.

An example embodiment of a method for quickly matching image features applied to mine machine vision in accordance with principles of inventive concepts will be described in relation to the flow chart of FIG. 1.

The process begins in step 1000 where de-noising an image to be analyzed using CBDNet network, wherein the image to be analyzed is a captured mine video frame image is employed.

In step 1002, performing super-pixel segmentation on the image to be analyzed obtained by de-noising, that is, on the de-noised image, to obtain a plurality of image blocks is carried out.

In step 1003, calculating the information entropy of each image block to obtain an image block with information entropy greater than a first preset threshold is performed.

In step 1004, using SURF algorithm to extract feature points of the image block with information entropy greater than a first preset threshold, to obtain the feature point set of the image to be analyzed is carried out.

In step 1005, using the Harr wavelet method to describe each feature point in the feature point set, so as to obtain the feature point descriptor set of the image to be analyzed is performed.

The example method ends in step 1006, matching the feature points in the feature point set of the image to be analyzed with the feature points of the target image based on the feature point descriptor set of the image to be analyzed to confirm whether an aspect of the mine is abnormal, wherein the target image is an image containing information indicative of an abnormality of the mine. By way of example, the target image can be an image of a coal conveyor belt with large stones.

Specifically, in step 1000, de-noising an image to be analyzed using CBDNet network comprises:

Step 1000.1: converting the image to be analyzed into an estimated noise level map by using the noise estimation subnetwork in the CBDNet network.

Step 1000.2: inputting the image to be analyzed and the estimated noise level map obtained by conversion into the non-blind de-noising network in the CBDNet network for de-noising to obtain the de-noised image to be analyzed.

In example embodiments, in step 1002, performing superpixel segmentation on the image to be analyzed obtained by de-noising to obtain a plurality of image blocks comprises:

Step 1002.1: initializing seed points (cluster centers): evenly distributing seed points in the image to be analyzed according to the set number of super pixels. The number of pixels of the image to be analyzed is N. For example, if the image to be analyzed is divided into k super pixels with the same size, the size of each super pixel is N/K, and the distance between adjacent seed points can be approximated as $S=\sqrt{(N/K)}$.

Step 1002.2: reselecting the seed points in the n*n neighborhood of the seed points, for example, n=3. The specific method is to calculate the gradient values of all pixels in the neighborhood, and move the seed points to the place with the smallest gradient in the neighborhood, so as to avoid the seed points falling on the contour boundary of the image to be analyzed with large gradient, so as not to affect the subsequent clustering effect.

Step 1002.3: assigning a class label (that is, which cluster center it belongs to) to each pixel point in the neighborhood of 2S*2S of each seed point, specifically comprising:

searching pixels in the neighborhood of the seed points 2S*2S, and calculating the distance measure between each pixel point and the seed point by the following formula based on the pixel point coordinates $(l_j, a_j, b_j, x_j, y_1)$ in the five-dimensional space and the pixel point coordinates $(l_i, a_i, b_i, x_i, y_i)$ at the seed point position:

$$D' = \sqrt{\left(\frac{d_c}{m}\right)^2 + \left(\frac{d_s}{S}\right)^2},$$

$$d_c = \sqrt{(l_j - l_i)^2 + (a_j - a_i)^2 + (b_j - b_i)^2},$$

$$d_s = \sqrt{(x_j - x_i)^2 + (y_j - y_i)^2},$$

$$D' = \sqrt{\left(\frac{d_c}{N_c}\right)^2 + \left(\frac{d_s}{N_s}\right)^2},$$

where D' denotes the distance measure, (l,a,b) denotes the color vector value of a pixel point, (x,y) denotes the coordinate position of a pixel point, $d_c$ denotes the color distance, $d_s$ denotes the spatial distance, and $N_s$ is the maximum spatial distance within a class, which is defined as $N_s=S=\sqrt{(N/K)}$. $N_c$ is the maximum color distance, a fixed constant m is usually selected, and the value range of m is [1, 40], preferably, m is 10.

Considering that each pixel point will be searched by a plurality of seed points, each pixel point will have a distance from the surrounding seed points, and the seed point corresponding to the minimum distance is taken as the cluster center of the pixel point.

Step 1002.4: Repeat steps 2.1 to 2.3 for iteration until the clustering center of each pixel point does not change any more. Preferably, the number of iterations is set to 10, which can achieve a better clustering effect.

Step 1002.5: The image to be analyzed is divided into a plurality of image blocks with each cluster center as the center and 2S*2S as the range.

In example embodiments, in step 1003, the information entropy of each image block is calculated in the following manner.

Step 1003.1: The number $h_i$ of pixels in the gray intensity level i in each image block is obtained according to the gray histogram of each image block.

Step 1003.2: The probability is calculated that all pixels in the image block are in the gray intensity level i:

$$p_i = \frac{h_i}{\sum_{i=1}^{L} h_i}$$

where i denotes the gray intensity level of pixels, $i \in [1,L]$, L denotes the number of gray intensity levels, and $h_i$ denotes the number of pixels in the gray intensity level i in the image block.

Step 1003.3: The information entropy of each image block is calculated and obtained:

$$H(A) = \Sigma_{i=1}^{L} p_i \log p_i, \ i \in [1,L]$$

Specifically, after the information entropy of all image blocks is obtained, some image blocks are filtered out according to the first preset threshold.

In example embodiments, in step 1004, extracting the feature points of the image block in the following manner comprises:

Step 1004.1: sequentially processing the image block by a plurality of filters with different sizes to obtain multiple image layers with the same image size and different scales in discrete space and the filter response value of each pixel point of the image in each image layer.

The image block is sequentially processed by a plurality of filters with different sizes to obtain multiple image layers with the same image size and different scales in discrete space and the filter response value of each pixel point of the image in each image layer.

Specifically, the Hessian matrix H(x,y,s) at any pixel point (x,y) in the image block with the scale s is defined as:

$$H(x, y, s) = \begin{bmatrix} D_{xx}(x, y, x) D_{xy}(x, y, s) \\ D_{xy}(x, y, s) D_{yy}(x, y, s) \end{bmatrix}$$

where (x,y) is the position coordinates of pixels, $D_{xx}(x,y,s)$ is the convolution of Gaussian second order differential $$\frac{\partial^2 g(x, y, s)}{\partial x^2}$$

with the image at the pixel point (x,y), $D_{xy}(x,y,s)$ is the convolution of $$\frac{\partial^2 g(x, y, s)}{\partial x \partial y}$$

with the image at the pixel point (x,y), and $D_{yy}(x,y,s)$ is the convolution of $$\frac{\partial^2 g(x, y, s)}{\partial y^2}$$

with the image at the pixel point (x,y), where $$g(x, y, s) = \frac{1}{2\pi s^2} e^{-\frac{x^2+y^2}{2s^2}}.$$

The principle of changing the image scale by a filter is the same as that of Gaussian differential function described above. The filter template is convolved with the image without changing the size of the image. By changing the size of the filter template, a plurality of image layers with gradually increasing scale and completely consistent size are constructed.

The filter response value of each pixel point in the image of each image layer is:

$$\det(H_{approx}) = D_{xx}(x,y,s)D_{yy}(x,y,s) - (0.9 D_{xy}(x,y,s))^2$$

where $\det(H_{approx})$ denotes the filter response value of a pixel point, s is the image scale, $D_{xx}(x,y,s)$ is the filter response value of the filter template at (x,y,s) in the x direction, $D_{yy}(x,y,s)$ is the filter response value of the template at (x,y,s) in y direction, and $D_{xy}(x,y,s)$ is the filter response value of the filter template at (x,y,s) in xy direction.

Step 1004.2: A plurality of the image layers are evenly divided into a plurality of groups of image stacks according to the scale, wherein the image scales from the first image layer in the first group of image stacks to the last image layer in the last group of image stacks increase in sequence, and the adjacent two groups of image stacks contain image layers with images of the same scale. The image layer of the images of the same scale is provided in two adjacent groups of image stacks, which can ensure that the obtained image stacks contain images of all scales. At the same time, the method of sampling at intervals in large-scale images can reduce the amount of calculation.

The filter size for obtaining the image of the $l_{th}$ image layer in the $o_{th}$ group of image stacks is:

$$L = 3 \times [2^{o+1} \times (l+1)+1],$$

where o=1, 2, 3 ... m, and l=1, 2, 3 ... t and the obtained image scale of the $l_{th}$ image layer in the $o_{th}$ group of image stacks is:

$$s_{appox} = L \times \frac{s_0}{L_0}$$

where $L_0$ is the filter size for obtaining the image of the first image layer in the first group of image stacks, and $S_0$ is the scale of the image of the first image layer in the first group of image stacks.

For example, the filter for obtaining the image of the first image layer in the first image stack is a filter template with a size of 9×9 and a scale of 1.2, which is used as a reference filter.

Step 1004.3: Pixels with filter response values less than a second preset threshold value in each image layer are removed to obtain a preliminary feature point set. Specifically, the second preset threshold can be set empirically, and preferably, the order of magnitude of the second preset threshold is 3.

Step 1004.4: In order to ensure the scale invariance of the image block, any preliminary feature point is taken as the feature point to be operated, the corresponding suppression radius is adaptively selected, non-maximum suppression is performed in the image layer where the point to be operated is located and in its adjacent image layer, pixels whose filter response value is less than that of the feature point to be operated are removed, and each preliminary feature point is traversed to obtain the feature point of the image block.

Specifically, the formula for adaptively selecting the suppression radius r is as follows:

$$r_i = \min \|X_i - X_j\|$$

s.t. $\det(H_{approx}(X_i)) \leq 0.9 \det(H_{approx}(X_j))$ where $X_i$ is the position vector $(x_i, y_i, s_i)$ of the feature point to be operated, $X_j$ is the position vector $(x_j, y_j, s_j)$ of other feature points in the image layer where the feature point to be operated is located, and $\det(H_{approx}(X))$ is the filter response value of the feature point.

In example embodiments, any feature point is taken as the feature point to be operated to determine the feature point whose filter response value in the image layer is greater than 0.9 times of the filter response value of the feature point to be operated, calculate the Euclidean distance between the feature point and the feature point to be operated, and use the smallest Euclidean distance as the suppression radius of the feature point to be operated.

In example embodiments adaptive non-maximum suppression is carried out in image stack groups, and the first layer and the last layer of each group have only one adjacent layer, so these two layers do not carry out non-maximum suppression. By adaptive non-maximum suppression, more feature points can be suppressed in the image area with a large number of feature points, and fewer feature points can be suppressed in the image area with sparse feature points, so that the feature points are evenly distributed. At the same time, the calculation amount of subsequent feature point matching is also reduced.

Each image block is traversed to obtain the feature point set of the image to be analyzed.

In example embodiments, prior to describing the feature points, the method further comprises: obtaining the offset of coordinates of each feature point in the feature point set of the image block by using a Taylor series interpolation method; and correcting the coordinates of the corresponding feature points in the discrete space by using the coordinate offset to obtain the coordinates of all the feature points of the image block in the continuous space, and determining the positions of the corresponding feature points based on the coordinates.

Assuming B(X) as the response value of the feature point X=(x,y,s), Taylor series expansion is:

$$B(X) = B + \left(\frac{\partial B}{\partial X}\right)^T X + \frac{1}{2} X^T \frac{\partial^2 B}{\partial X^2} X$$

The corresponding offset is:

$$\hat{x} = -\left(\frac{\partial^2 B}{\partial X^2}\right)^{-1} \frac{\partial B}{\partial X}$$

Then the new coordinates $\hat{X}$ of the feature points fitted by the difference of Taylor series are $\hat{X}=X+\hat{x}$.

In example embodiments, in step 1005, using the Harr wavelet method to describe each feature point in the feature point set, so as to obtain the feature point descriptor set of the image to be analyzed, comprises:

Step 1005.1: obtaining the main direction of each feature point in the feature point set, specifically comprising:

Step 1005.1.1: constructing a circular neighborhood with a preset radius size by taking any feature point in the feature point set as a center, and determining pixels included in the circular neighborhood according to the position coordinates of any feature point, wherein preferably, the preset radius size is 6s, and s denotes the scale of the image block to which the feature point belongs;

Step 1005.1.2: calculating and obtaining the horizontal Haar wavelet response and the vertical Haar wavelet response of each pixel point in the circular neighborhood, and giving Gaussian weight coefficients to the horizontal Haar wavelet response and the vertical Haar wavelet response of the pixel point according to the distance between the pixel point and the feature point, wherein Gaussian weight coefficients are proportional to the wavelet response value;

Step 1005.1.3: counting the sum of the horizontal Haar wavelet response and the vertical Haar wavelet response after giving Gaussian weight coefficient to all other feature points in a 60° sector area with the feature point as the center to obtain a corresponding direction vector;

Step 1005.1.4: rotating the 60° sector area in a preset angle unit, traversing the circular neighborhood of the feature points to obtain corresponding direction vectors, comparing all the direction vectors, and taking the direction corresponding to the longest direction vector as the main direction of the feature points, wherein preferably, the preset angle unit is 5°;

Step 1005.1.5: traversing each feature point to obtain the main directions of all feature points;

Step 1005.2: constructing a rectangular neighborhood with a preset side length of 20s by taking any feature point as a center, taking the main direction of the feature point as the main direction of the rectangular neighborhood, and dividing the rectangular neighborhood into 16 sub-regions with preset sizes of 5s*5s;

Step 1005.3: calculating horizontal Haar wavelet response and vertical Haar wavelet response of each pixel point in each sub-region and summing them, respectively, to obtain the sum $\Sigma d_x$ of horizontal Haar wavelet response and the sum $\Sigma d_y$ of vertical Haar wavelet response in the sub-region, the sum $\Sigma|d_x|$ of horizontal Haar wavelet response absolute value and the sum $\Sigma|d_y|$ of vertical Haar wavelet response absolute value in the sub-region, wherein the descriptor of the sub-region is $V_j=[\Sigma d_x, \Sigma d_y, \Sigma|d_x|, \Sigma|d_y|]$, so as to obtain the descriptor $V=[V_1, V_2, V_3 \ldots V_s]$ of the feature point, $j \in [1, 16]$;

Step 1005.4: traversing each feature point to obtain a descriptor of each feature point.

In example embodiments, in step 1006, matching the feature points in the feature point set of the image to be analyzed with the feature points of the target image based on the feature point descriptor set of the image to be analyzed to confirm whether the mine is abnormal comprises:

obtaining Euclidean distance between any feature point in the feature point set of the image to be analyzed and each feature point in the feature point set of the target image based on descriptors of any feature point in the feature point set of the image to be analyzed, and determining Euclidean distance between the nearest feature point and the next nearest feature point and any feature point in the feature point set of the image to be analyzed, wherein the descriptor of a feature point is the feature vector of the feature point:

$$NNDR = \frac{\sqrt{\sum_{j=1}^{j=16}(V_j - V'_{j,1})^2}}{\sqrt{\sum_{j=1}^{j=16}(V_j - V'_{j,2})^2}}$$

where V is the feature vector corresponding to any feature point in the image to be analyzed, $V'_1$ is the feature vector of the feature point in the target image nearest any feature point in the image to be analyzed, $V'_2$ is the feature vector of the feature point in the target image next nearest any feature point in the image to be analyzed, and NNDR is the ratio of Euclidean distances between the nearest feature point and the next nearest feature point;

if the ratio of Euclidean distances between the nearest feature point and the next nearest feature point is less than a preset value, judging that any feature point in the image to be analyzed matches the nearest feature point of the target image as a feature point pair, wherein preferably, the preset value is 0.8;

traversing all feature points in the feature point set of the image to be analyzed for matching;

if the matching rate between the feature points in the feature point set of the image to be analyzed and the feature points in the feature point set of the target image reaches a third preset threshold, judging that the mine is abnormal. For example, the third preset threshold is 90%.

In example embodiments, the feature points and the feature point descriptors in the target image are also obtained by the same method as above.

Figure 2:
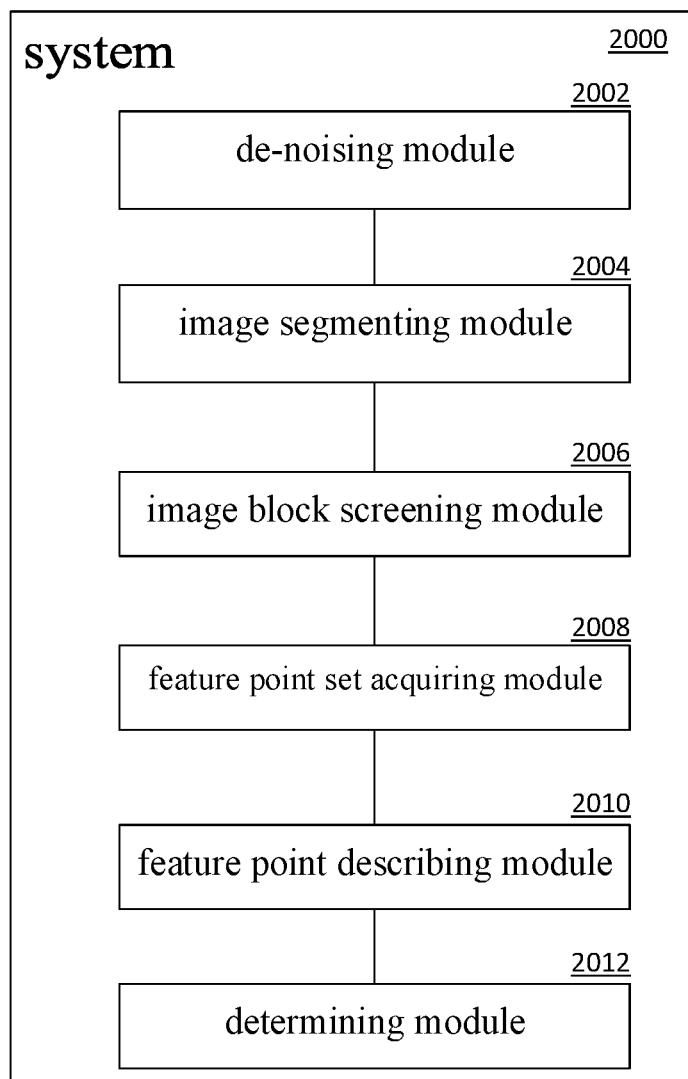
FIG. 2 is a schematic diagram of a system for quickly matching image features applied to mine machine vision according to an embodiment of the present disclosure.

An example embodiment of a system 2000 that may be employed in accordance with principles of inventive concepts is illustrated in the block diagram of FIG. 2. System 2000 includes:

a processor including a de-noising module 2002, which is configured to de-noise an image to be analyzed using CBDNet network, wherein the image to be analyzed is an intercepted mine video frame image;

a processor including an image segmenting module 2004, which is configured to perform super-pixel segmentation on the image to be analyzed obtained by de-noising to obtain a plurality of image blocks;

a processor including an image block screening module 2006, which is configured to calculate the information entropy of each image block to obtain an image block with information entropy greater than a first preset threshold;

a processor including a feature point set acquiring module 2008, which is configured to use SURF algorithm to extract feature points of the image block with information entropy greater than a first preset threshold, so as to obtain the feature point set of the image to be analyzed;

a processor including a feature point describing module 2010, which is configured to use the Harr wavelet method to describe each feature point in the feature point set, so as to obtain the feature point descriptor set of the image to be analyzed; and a processor including a determining module 2012, which is configured to match the feature points in the feature point set of the image to be analyzed with the feature points of the target image based on the feature point descriptor set of the image to be analyzed to confirm whether the mine is abnormal, wherein the target image is an image containing abnormal information of the mine.

Compared with the prior art, the method and the system for quickly matching image features applied to mine machine vision provided by the present disclosure first matches each frame of images in mine monitoring video with images containing aspects related to abnormal mine conditions, so as to automatically judge whether an aspect of the mine is abnormal, avoid the problems of low efficiency, poor real-time performance and low accuracy of manual judgment, and save labor cost to a certain extent; second, according to the present disclosure, image blocks are obtained by super-pixel segmentation and information entropy calculation of video frame images, and it is judged whether the mine is abnormal based on the image blocks. Through super-pixel segmentation, the definition of the underground object outline and the perception of object color information can be improved, the accuracy of identifying mine anomalies is improved, and the defects are avoided that the underground environment illumination distribution is uneven, it is difficult to distinguish the object outline, and the mine dust and low illumination make the object color close to the surrounding environment color so that it is difficult for people to judge the mine abnormal situation; in addition, the present disclosure judges based on a part of image blocks of the video frame image, thus avoiding calculation based on all pixels of the whole video frame image, which greatly reduces the calculation amount, improves the efficiency and real-time performance of identifying mine anomalies, and is beneficial to processing mine anomalies in time.

It can be understood by those skilled in the art that all or part of the processes for implementing the method of the above embodiments can be completed by instructing related hardware such as a processor through a computer program, and the program can be stored in a computer readable storage medium. The computer readable storage medium may be a magnetic disk, an optical disk, a read-only memory or a random access memory.

The above is only an example embodiment of the present disclosure, and the protection scope of the present disclosure is not limited thereto. Any change or substitution conceivable to those skilled in the art within the technical scope disclosed by the present disclosure should be covered within the protection scope of the present disclosure.

What is claimed is:

1. A method for matching image features applied to mine machine vision, comprising:
a processor de-noising an image to be analyzed using CBDNet network, wherein the image to be analyzed is a captured mine video frame image;
a processor performing super-pixel segmentation on the image to be analyzed obtained by de-noising to obtain a plurality of image blocks;
a processor calculating the information entropy of each image block to obtain an image block with information entropy greater than a first preset threshold;
a processor using SURF algorithm to extract feature points of the image block with information entropy greater than a first preset threshold, to obtain a feature point set of the image to be analyzed;
a processor using a Harr wavelet method to describe each feature point in the feature point set to obtain a feature point descriptor set of the image to be analyzed; and
a processor matching the feature points in the feature point set of the image to be analyzed with feature points of a target image based on the feature point descriptor set of the image to be analyzed to confirm whether an aspect of the mine is abnormal, wherein the target image is an image containing information related to potential abnormalities of the mine.

2. The method for matching image features according to claim 1, wherein the information entropy of each image block is calculated by:
a processor calculating the probability that all pixels in the image block are in a gray intensity level i:

$$p_i = \frac{h_i}{\sum_{i=1}^{L} h_i}$$

where i denotes the gray intensity level of pixels, $i \in [1,L]$, L denotes the number of gray intensity levels, and $h_i$ denotes the number of pixels in the gray intensity level i in the image block; and a processor calculating and obtaining the information entropy of each image block:

$$H(A) = \Sigma_{i=1}^{L} p_i \log p_i, \ i \in [1,L].$$

3. The method for matching image features according to claim 2, wherein the number of pixels in the gray intensity level i in each image block is obtained according to a gray histogram of each image block.

4. The method for matching image features according to claim 2, wherein extracting the feature points of the image block comprises:
sequentially processing an image block by a plurality of filters with different sizes to obtain a plurality of image layers with the same image size and different scales in discrete space and the filter response value of each pixel point of the image in each image layer;
evenly dividing a plurality of the image layers into a plurality of groups of image stacks according to the scale, wherein the image scales from the first image layer in the first group of image stacks to the last image layer in the last group of image stacks increase in sequence, and the adjacent two groups of image stacks contain image layers with images of the same scale;
removing pixels with filter response values less than a second preset threshold value in each image layer to obtain a preliminary feature point set; and
taking any preliminary feature point as a feature point to be operated, adaptively selecting the corresponding suppression radius, performing non-maximum suppression in the image layer where the feature point to be operated is located and in its adjacent image layer, removing pixels whose filter response value is less than that of the feature point to be operated, and traversing each preliminary feature point to obtain the feature point of the image block.

5. The method for matching image features according to claim 4, wherein the filter size for obtaining the image of the $l_{th}$ image layer in the $o_{th}$ group of image stacks is:

$$L=3\times[2^{o+1}\times(l+1)+1]$$

where o=1, 2, 3 . . . m, and l=1, 2, 3 . . . t, and the obtained image scale of the $l_{th}$ image layer in the $o_{th}$ group of image stacks is:

$$s_{appox} = L \times \frac{s_0}{L_0}$$

where $L_0$ is the filter size for obtaining the image of the first image layer in the first group of image stacks, and $S_0$ is the scale of the image of the first image layer in the first group of image stacks.

6. The method for matching image features according to claim 4, wherein prior to describing the feature points, the method further comprises:
    obtaining an offset of coordinates of each feature point in the feature point set of the image to be analyzed by using a Taylor series interpolation method; and
    correcting the coordinates of the corresponding feature points in the discrete space by using the coordinate offset to obtain the coordinates of all the feature points of the image to be analyzed in the continuous space, and determining the positions of the corresponding feature points based on the coordinates.

7. The method for matching image features according to claim 6, wherein using the Harr wavelet method to describe each feature point in the feature point set to obtain the feature point descriptor set of the image to be analyzed, comprises:
    obtaining the main direction of each feature point in the feature point set;
    constructing a rectangular neighborhood with a preset side length by taking any feature point as a center, taking the main direction of the feature point as the main direction of the rectangular neighborhood, and dividing the rectangular neighborhood into a plurality of sub-regions with preset sizes;
    calculating horizontal Haar wavelet response and vertical Haar wavelet response of each pixel point in each sub-region and summing them, respectively, to obtain the sum $\Sigma d_x$ of horizontal Haar wavelet response and the sum $\Sigma d_y$ of vertical Haar wavelet response in the sub-region, the sum $\Sigma|d_x|$ of horizontal Haar wavelet response absolute value and the sum $\Sigma|d_y|$ of vertical Haar wavelet response absolute value in the sub-region wherein the descriptor of the sub-region is $V_j=[\Sigma d_x, \Sigma d_y, \Sigma|d_x|, \Sigma|d_y|]$, so as to obtain the descriptor $V=[V_1, V_2, V_3 \ldots V_s]$ of the feature point, $j\in[1, S]$, and S is the number of sub-regions in the rectangular region; and
    traversing each feature point to obtain a descriptor of each feature point.

8. The method for matching image features according to claim 7, wherein the main direction of each feature point in the feature point set is obtained by:
    constructing a circular neighborhood with a preset radius size by taking any feature point in the feature point set as a center, and determining pixels included in the circular neighborhood according to the position coordinates of any feature point;
    calculating and obtaining the horizontal Haar wavelet response and the vertical Haar wavelet response of each pixel point in the circular neighborhood, and giving Gaussian weight coefficients to the horizontal Haar wavelet response and the vertical Haar wavelet response of the pixel point according to the distance between the pixel point and the feature point;
    counting the sum of the horizontal Haar wavelet response and the vertical Haar wavelet response after giving Gaussian weight coefficient to all other feature points in a 60° sector area with the feature point as the center to obtain a corresponding direction vector;
    rotating the 60° sector area in a preset angle unit, traversing the circular neighborhood of the feature points to obtain corresponding direction vectors, comparing all the direction vectors, and taking the direction corresponding to the longest direction vector as the main direction of the feature points; and
    traversing each feature point to obtain the main directions of all feature points.

9. The method for matching image features according to claim 7, wherein matching the feature points in the feature point set of the image to be analyzed with the feature points of the target image based on the feature point descriptor set of the image to be analyzed to confirm whether the mine is abnormal comprises:
    obtaining Euclidean distance between any feature point in the feature point set of the image to be analyzed and each feature point in the feature point set of the target image based on descriptors of any feature point in the feature point set of the image to be analyzed, and determining Euclidean distance between the nearest feature point and the next nearest feature point and any feature point in the feature point set of the image to be analyzed;
    if the ratio of Euclidean distances between the nearest feature point and the next nearest feature point is less than a preset value, judging that any feature point in the image to be analyzed matches the nearest feature point of the target image as a feature point pair;
    traversing all feature points in the feature point set of the image to be analyzed for matching; and
    if a matching rate between the feature points in the feature point set of the image to be analyzed and the feature points in the feature point set of the target image reaches a third preset threshold, judging that the mine is abnormal.

10. A system for matching image features applied to mine machine vision, comprising:
    a processor including a de-noising module, which is configured to de-noise an image to be analyzed using CBDNet network, wherein the image to be analyzed is an intercepted mine video frame image;
    a processor including an image segmenting module, which is configured to perform super-pixel segmentation on the image to be analyzed obtained by de-noising to obtain a plurality of image blocks;
    a processor including an image block screening module, which is configured to calculate the information entropy of each image block to obtain an image block with information entropy greater than a first preset threshold;
    a processor including a feature point set acquiring module, which is configured to use SURF algorithm to extract feature points of the image block with information entropy greater than a first preset threshold, so as to obtain the feature point set of the image to be analyzed;
    a processor including a feature point describing module, which is configured to use the Harr wavelet method to describe each feature point in the feature point set, so as to obtain a feature point descriptor set of the image to be analyzed; and a processor including a determining module, which is configured to match the feature points in the feature point set of the image to be analyzed with the feature points of the target image based on the feature point descriptor set of the image to be analyzed to confirm whether an aspect of the mine is abnormal, wherein the target image is an image containing information related to potential abnormalities of the mine.

\* \* \* \* \*